(12) United States Patent
Cho et al.

(10) Patent No.: US 11,476,548 B2
(45) Date of Patent: Oct. 18, 2022

(54) BATTERY MODULE

(71) Applicant: LG CHEM, LTD., Seoul (KR)

(72) Inventors: Yong Jin Cho, Daejeon (KR); Jun Yeob Seong, Daejeon (KR); Jun Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 235 days.

(21) Appl. No.: 16/759,932

(22) PCT Filed: Feb. 14, 2019

(86) PCT No.: PCT/KR2019/001815
§ 371 (c)(1),
(2) Date: Apr. 28, 2020

(87) PCT Pub. No.: WO2019/231075
PCT Pub. Date: Dec. 5, 2019

(65) Prior Publication Data
US 2020/0328396 A1 Oct. 15, 2020

(30) Foreign Application Priority Data
May 29, 2018 (KR) .......................... 10-2018-0061360

(51) Int. Cl.
*H01M 50/531* (2021.01)
*H01M 50/543* (2021.01)

(52) U.S. Cl.
CPC ....... *H01M 50/531* (2021.01); *H01M 50/543* (2021.01)

(58) Field of Classification Search
CPC combination set(s) only.
See application file for complete search history.

(56) References Cited

U.S. PATENT DOCUMENTS 6,387,567 B1 5/2002 Noh
8,445,125 B2 5/2013 Baek
(Continued)

FOREIGN PATENT DOCUMENTS

CN 110622341 A 12/2019
EP 3624227 A1 3/2020
(Continued)

OTHER PUBLICATIONS

Extended European Search Report for European Application No. 19811573.5, dated Jun. 7, 2021.
(Continued)

*Primary Examiner* — Ula C Ruddock
*Assistant Examiner* — Sarika Gupta
(74) *Attorney, Agent, or Firm* — Birch, Stewart, Kolasch & Birch, LLP

(57) ABSTRACT

A battery module including a plurality of battery cells that are sequentially stacked, each of the battery cells including an electrode assembly including a plurality of electrode plates and a plurality of electrode tabs withdrawn from the plurality of electrode plates, a pouch configured to receive the electrode assembly, and an electrode lead connected to the plurality of electrode tabs, the electrode lead extending from an extension part of the pouch so as to be withdrawn to the outside through a withdrawal port is provided. In order to secure the distance between the extension part of the pouch of one battery cell, among a plurality of adjacent battery cells, and the electrode lead of another battery cell, the extension part is provided with a bent part that is bent at a predetermined angle relative to the direction in which the plurality of battery cells are stacked.

9 Claims, 9 Drawing Sheets

(56) References Cited

U.S. PATENT DOCUMENTS

| | | | |
|---|---|---|---|
| 8,734,986 B2 | 5/2014 | Yamamura et al. | |
| 9,209,428 B2 | 12/2015 | Jung et al. | |
| 9,537,177 B2 | 1/2017 | Lee | |
| 2004/0253512 A1* | 12/2004 | Watanabe | H01M 4/131 |
| | | | 429/185 |
| 2009/0017376 A1 | 1/2009 | Yamamura et al. | |
| 2010/0143787 A1 | 6/2010 | Jung et al. | |
| 2011/0129718 A1 | 6/2011 | Lee | |
| 2011/0171498 A1 | 7/2011 | Baek | |
| 2017/0110712 A1* | 4/2017 | Ahn | H01M 50/172 |
| 2018/0090737 A1* | 3/2018 | Sawanishi | H01M 50/20 |
| 2020/0067066 A1 | 2/2020 | Kim et al. | |

FOREIGN PATENT DOCUMENTS

| | | |
|---|---|---|
| JP | 2000-311713 A | 11/2000 |
| JP | 2001-52659 A | 2/2001 |
| JP | 2004-87337 A | 3/2004 |
| JP | 2007-214025 A | 8/2007 |
| JP | 2007-229788 A | 9/2007 |
| JP | 2013-45795 A | 3/2013 |
| JP | 2014-53104 A | 3/2014 |
| JP | 2015-5381 A | 1/2015 |
| JP | 2018-41611 A | 3/2016 |
| KR | 10-2003-0033214 A | 5/2003 |
| KR | 10-2008-0041113 A | 5/2008 |
| KR | 10-2009-0006765 A | 1/2009 |
| KR | 10-2011-0061281 A | 6/2011 |
| KR | 10-2011-0082747 A | 7/2011 |
| KR | 10-2011-0107987 A | 10/2011 |
| KR | 10-2017-0019044 A | 2/2017 |
| KR | 10-2017-0059284 A | 5/2017 |
| KR | 10-2017-0135473 A | 12/2017 |
| KR | 10-2018-0028311 A | 3/2018 |

OTHER PUBLICATIONS

International Search Report for PCT/KR2019/001815 dated May 16, 2019.

* cited by examiner

[FIG. 1]
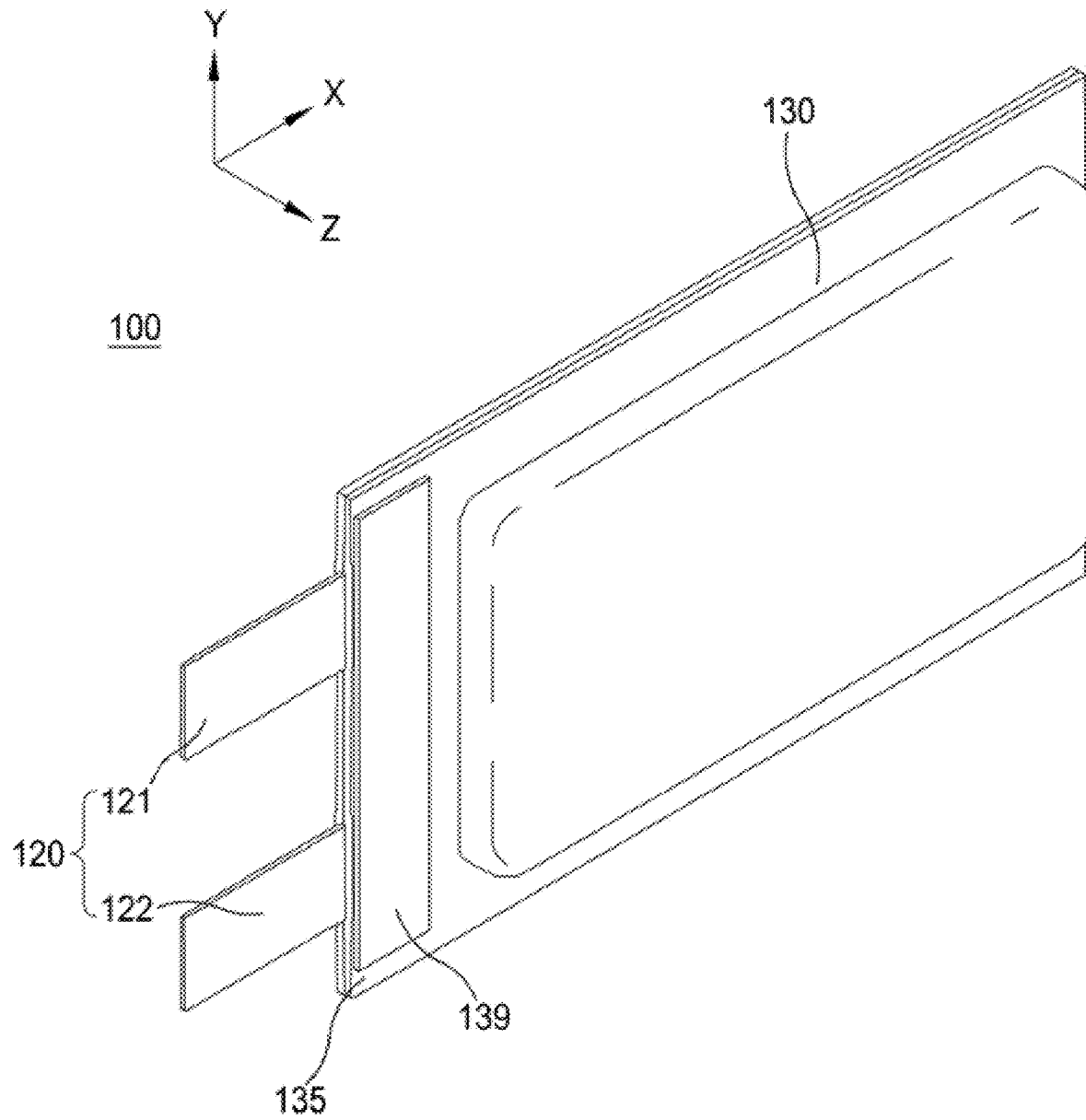

[FIG. 2]
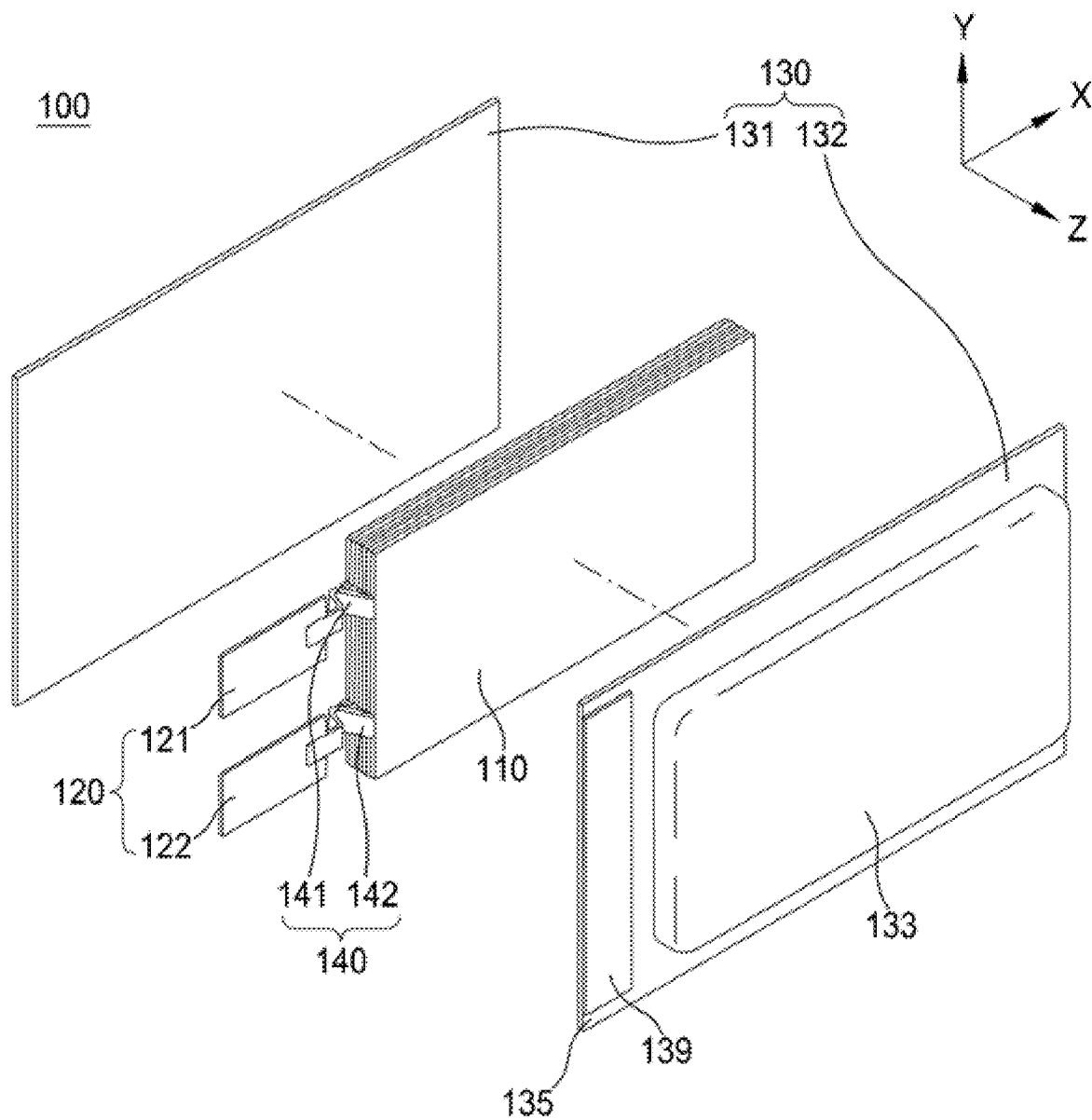

[FIG. 3]
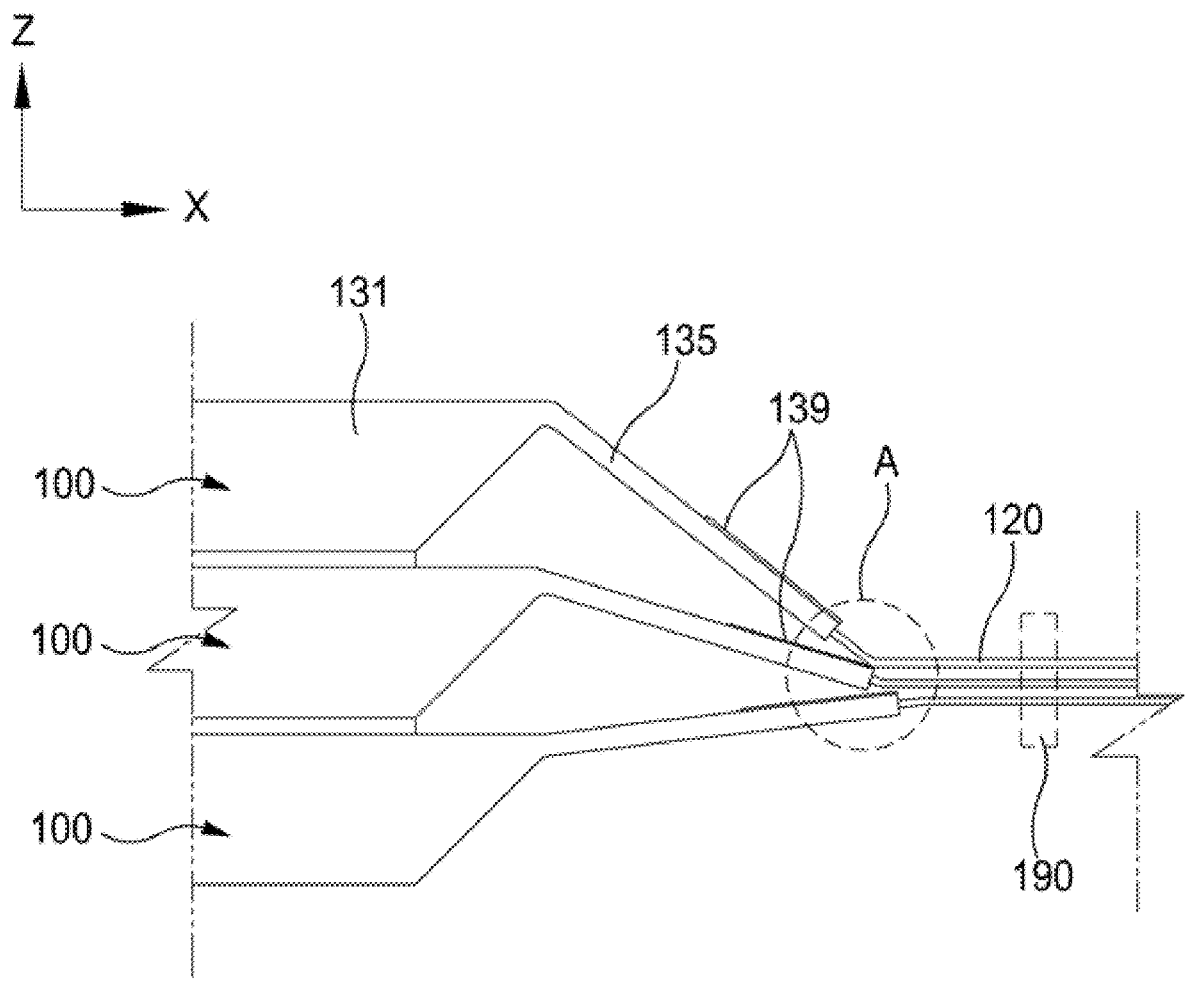

[FIG. 4]
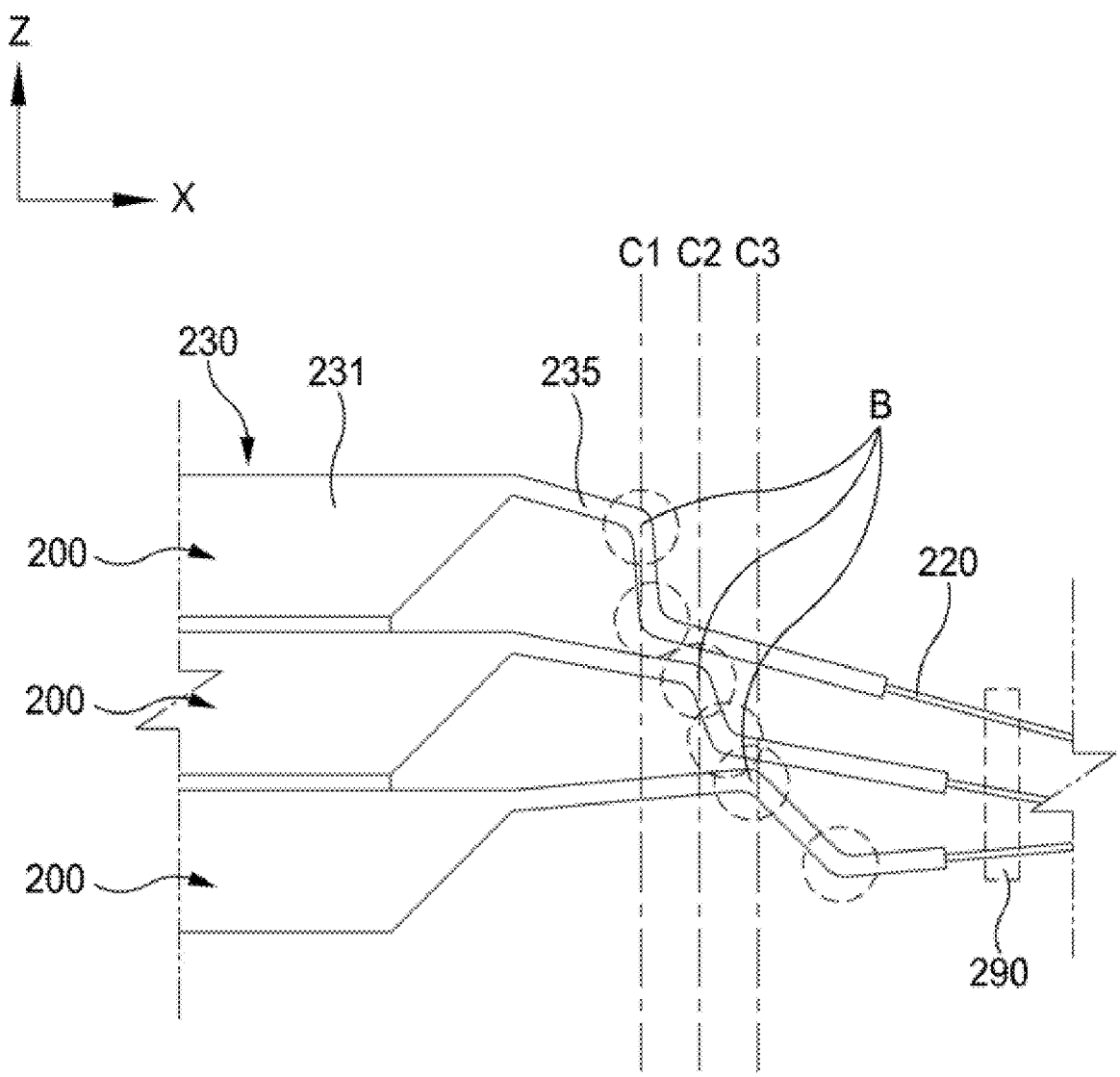

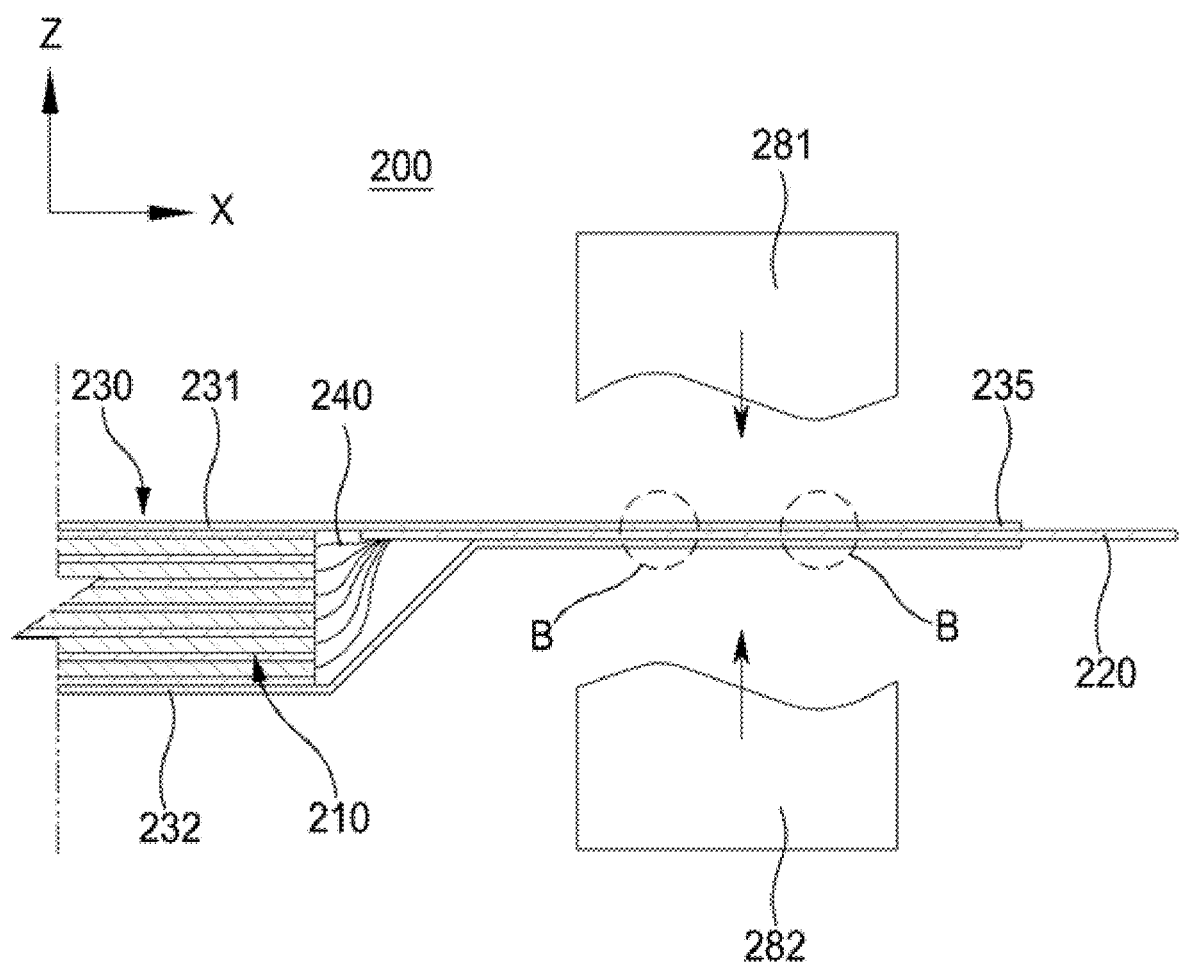
[FIG. 5]

【FIG. 6】
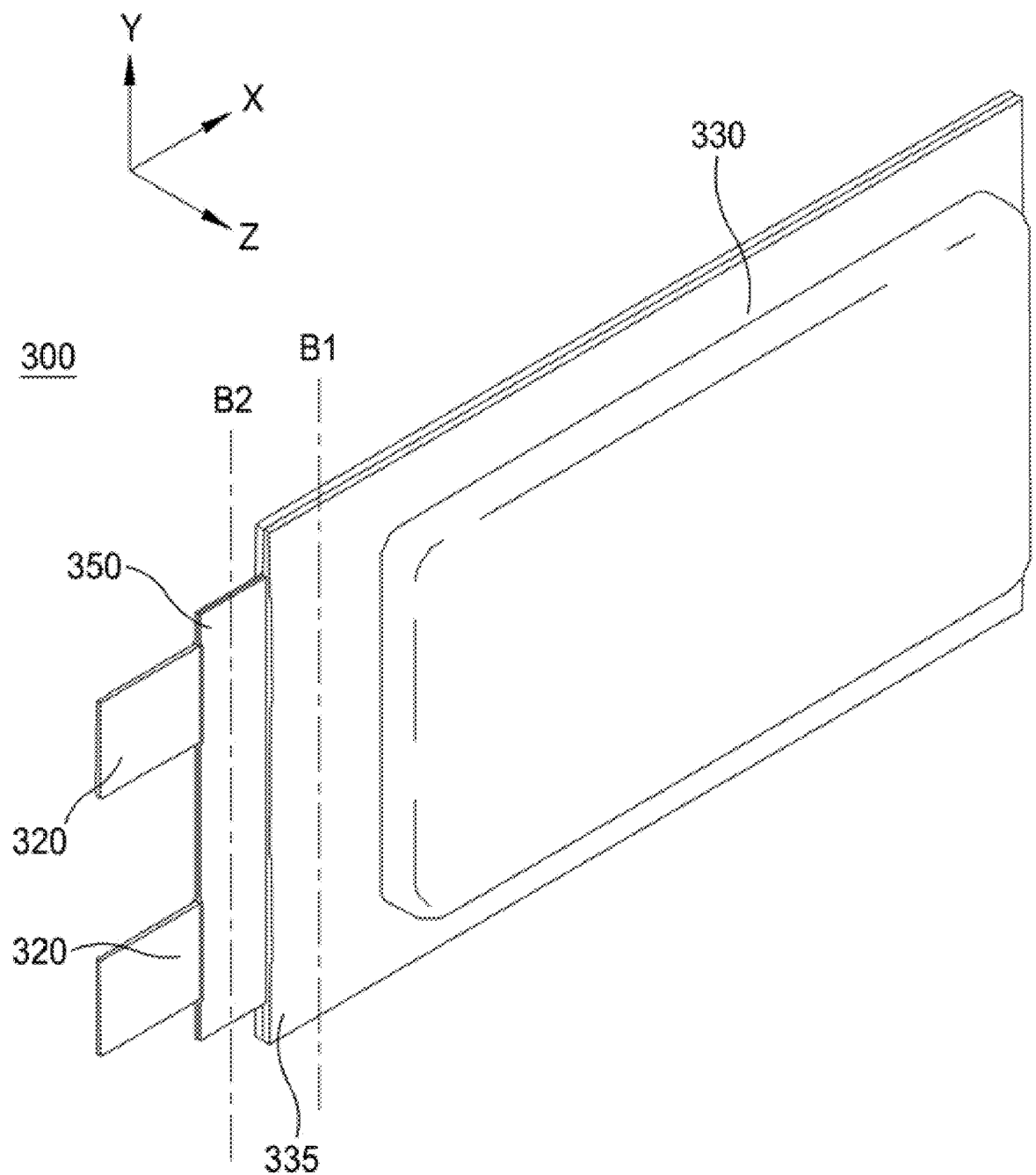

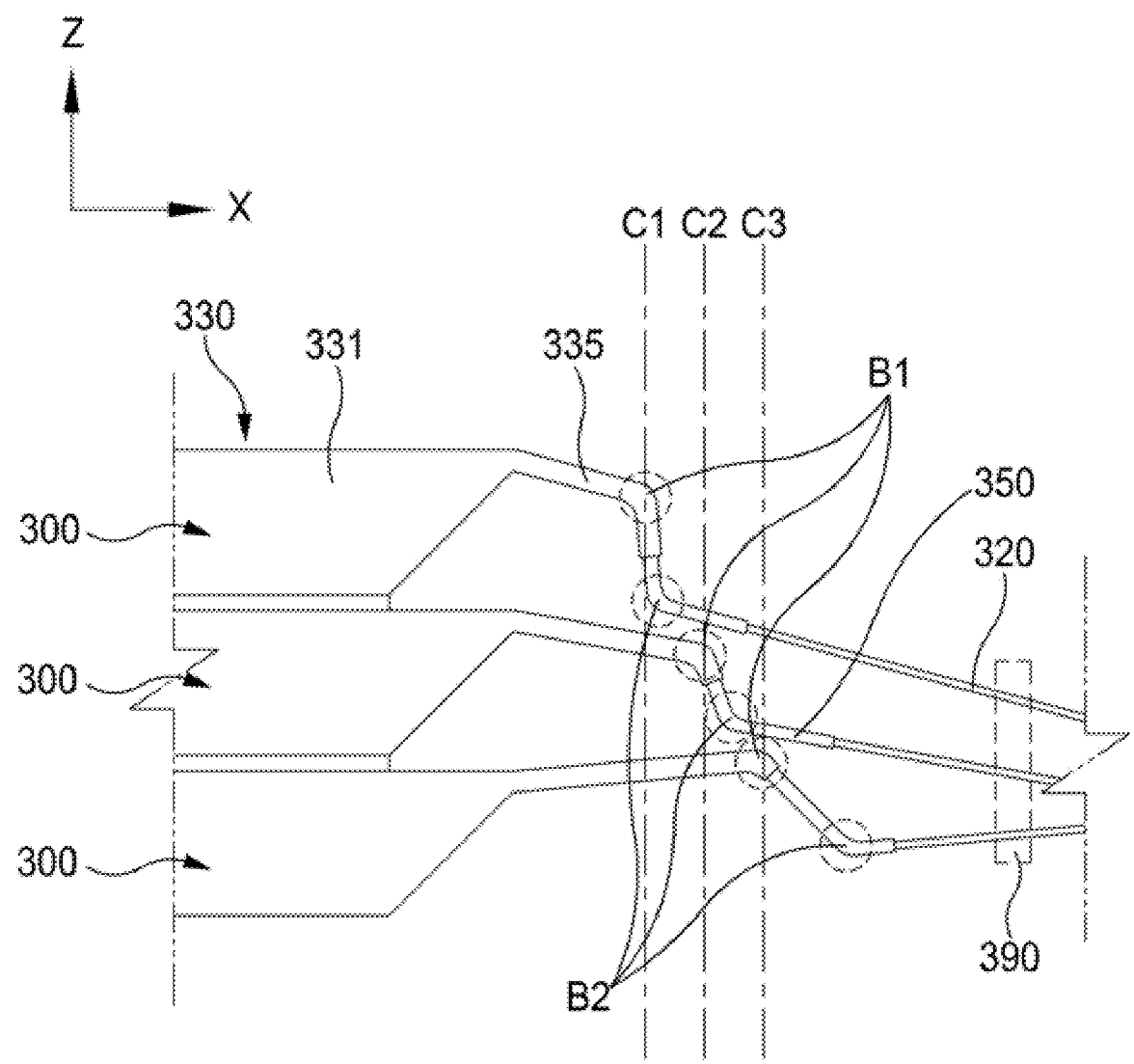
[FIG. 7]

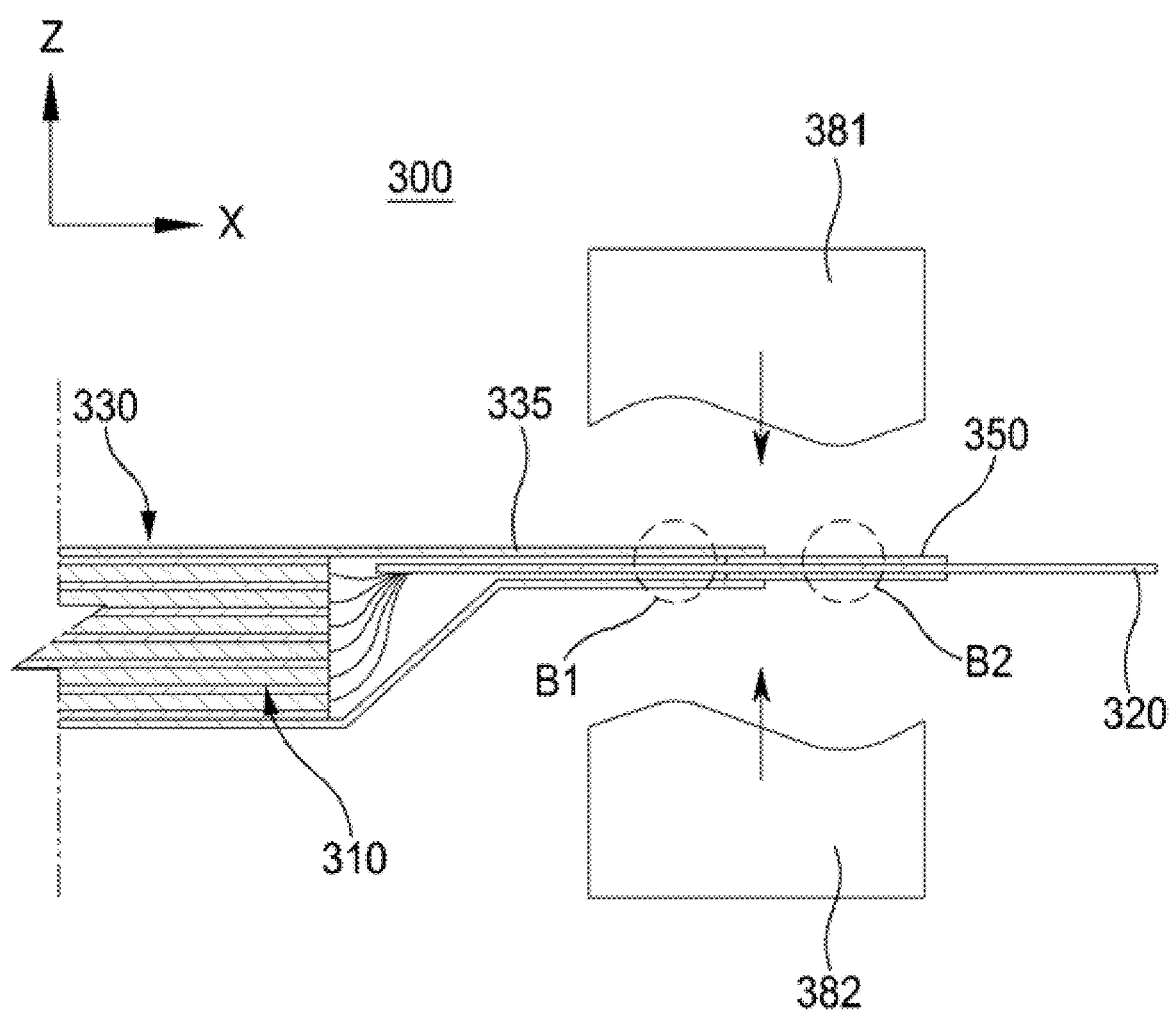
[FIG. 8]

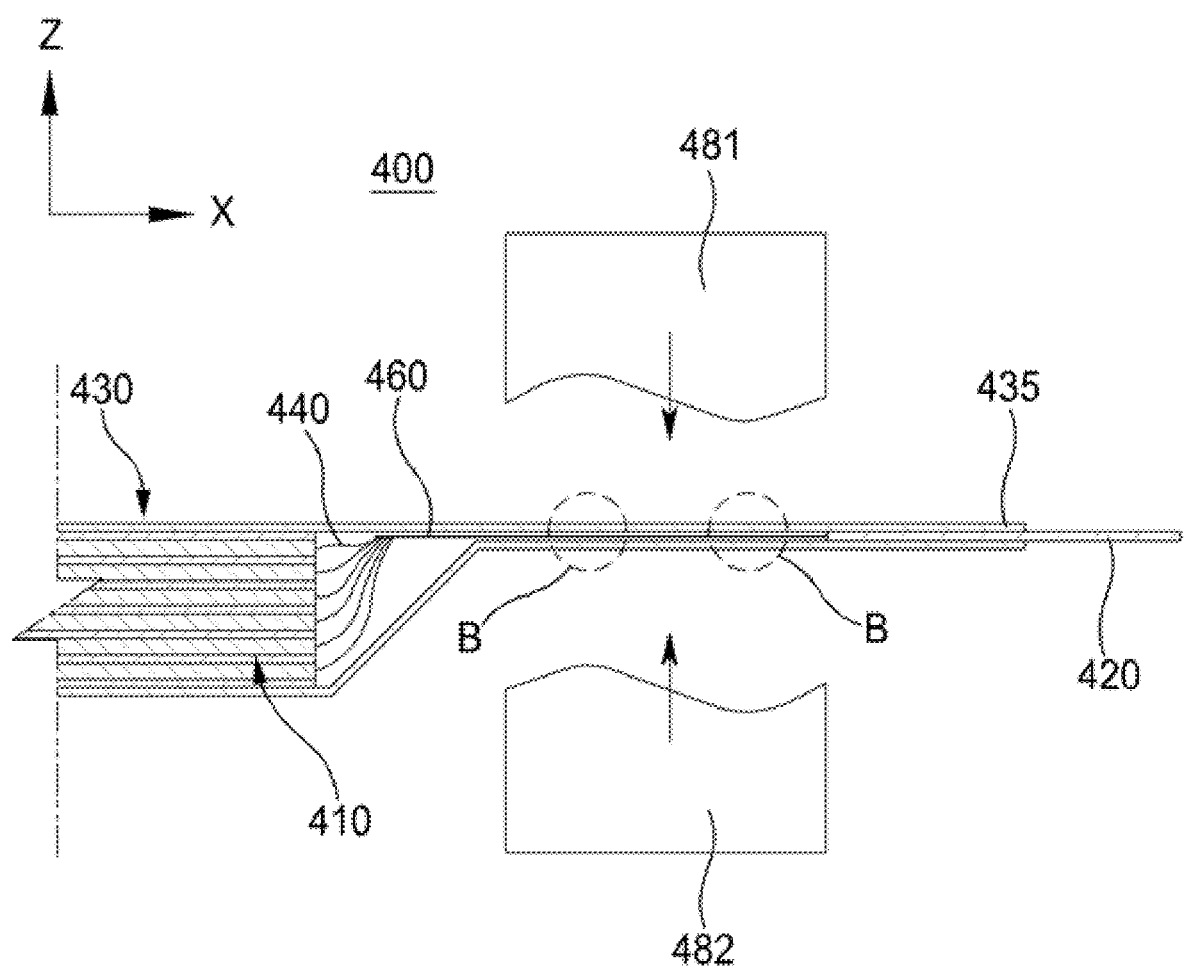
[FIG. 9]

BATTERY MODULE

TECHNICAL FIELD

This application claims the benefit of priority to Korean Patent Application No. 2018-0061360 filed on May 29, 2018, the disclosure of which is hereby incorporated by reference herein its entirety.

The present invention relates to a battery module.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in middle- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential part of a hybrid vehicle or an electric vehicle is a battery pack configured to supply electric power to a motor.

The hybrid vehicle or the electric vehicle has an advantage in that fuel economy is high and no pollutants are discharged or the amount of pollutants that are discharged is reduced compared to a vehicle using only an internal combustion engine, since it is possible to obtain drive force from the battery pack.

The battery pack used in the hybrid vehicle or the electric vehicle includes a battery module, which includes a plurality of battery cells. The plurality of battery cells are connected to each other in series and/or in parallel, whereby the capacity and output of the battery module are increased.

In recent years, interest in a battery module including a pouch-shaped battery cell has increased. The pouch-shaped battery cell has an advantage in that the weight of the pouch-shaped battery cell is small, the cost of manufacturing the pouch-shaped battery cell is low, and it is easy to deform the pouch-shaped battery cell, since an aluminum laminate sheet, etc. is used as a sheathing member.

As shown in FIGS. 1 to 3, a conventional battery module includes pouch-shaped battery cells 100. Each of the battery cells 100 includes an electrode assembly 110, electrode leads 120, and a pouch 130.

Hereinafter, for the convenience of description, the length direction of the battery cell 100 will be defined as an X-axis direction, the width direction of the battery cell 100 will be defined as a Y-axis direction, and the thickness direction of the battery cell 100 will be defined as a Z-axis direction.

The electrode assembly 110 includes a plurality of electrode plates and a plurality of separators interposed between the plurality of electrode plates. The plurality of electrode plates include one or more positive electrode plates and one or more negative electrode plates. Each of the electrode plates of the electrode assembly 110 is provided with electrode tabs 140. The electrode tabs 140 are configured so as to protrude outwards from a corresponding one of the electrode plates.

The end (the connection part) of each of the electrode leads 120 is connected to the electrode assembly 110 via the electrode tabs 140, and the end of the electrode lead 120 that is opposite the connection part of the electrode lead, which is connected to the electrode assembly 110, is exposed out of the pouch 130. The electrode leads 120 serve as electrode terminals of the battery module. The electrode leads 120 include a positive electrode lead 121 and a negative electrode lead 122. The electrode leads 121 and 122 are electrically connected to the electrode assembly 110 via the electrode tabs 140. The electrode leads 121 and 122 are welded to connection parts of the electrode tabs 140, whereby the electrode leads are connected to the electrode tabs 140.

Each of the plurality of electrode plates, i.e. the positive electrode plates and the negative electrode plates, is provided with the electrode tabs 140. The electrode tabs 140 include positive electrode tabs 141, which are connected to the positive electrode lead 121, and negative electrode tabs 142, which are connected to the negative electrode lead 122. A plurality of positive electrode tabs 141 is connected to a single positive electrode lead 121, and a plurality of negative electrode tabs 142 is connected to a single negative electrode lead 122.

The pouch 130 has therein a reception space, configured to receive the electrode assembly 110, and an electrolytic solution. The pouch 130 includes a first pouch member 131 and a second pouch member 132. A concave reception recess 133 is formed in one of the first pouch member 131 and the second pouch member 132.

The first pouch member 131 and the second pouch member 132 are coupled to each other in order to form the reception space. The edges of the first pouch member 131 and the second pouch member 132 are sealed together by thermal bonding, etc., whereby the reception space is hermetically sealed.

The pouch 130 has an extension part 135, which extends from the part of the pouch in which the reception space is formed, and the electrode leads 120 are withdrawn outwards from the extension part 135.

In the battery module, the plurality of battery cells 100 are stacked in the Z-axis direction, and each of the plurality of battery cells 100 is provided at one side thereof with a withdrawal port 190, through which the plurality of electrode leads 120 withdrawn from the plurality of battery cells 100 are withdrawn outwards.

In order to withdraw the plurality of electrode leads 120 withdrawn from the plurality of battery cells 100 through the withdrawal port 190, the plurality of electrode leads 120 are bent toward the withdrawal port 190. In the case in which the plurality of electrode leads 120 are bent toward the withdrawal port 190, however, the electrode leads 120 withdrawn from one battery cell 100, among the plurality of battery cells 100, may contact the extension part 135 extending from another battery cell 100, among the plurality of battery cells 100 (see part A in FIG. 3). In the case in which the electrode leads 120 contact the extension part 135, the extension part 135 may corrode due to a reaction between the electrode leads 120 and the extension part 135 based on the electrical properties thereof. In the case in which the extension part 135 is corroded, the electrolytic solution received in the pouch 130 may leak out of the pouch, leading to the concern that the electrical performance and safety of the battery cell 100 may be deteriorated.

In order to overcome this concern, conventionally, an insulating tape 139 is attached to the extension part 135 of the pouch 130 to prevent direct contact between the electrode leads 120 and the extension part 135 of the pouch 130.

However, a process of attaching the insulating tape 139 is additionally required, whereby the process of manufacturing the battery module becomes complicated. In addition, a process of adjusting the position or the orientation of the electrode leads 120 or the pouch 130 is required in order to attach the insulating tape to the pouch 130, and the electrode leads 120 or the pouch 130 may be damaged during the process of adjusting the position or the orientation of the electrode leads 120 or the pouch 130.

DISCLOSURE

Technical Problem

The present invention has been made in view of the above problems, and it is an object of the present invention to provide a battery module configured to have a structure capable of preventing contact between an extension part of a pouch and an electrode lead extending from a plurality of adjacent battery cells.

Technical Solution

In accordance with the present invention, the above and other objects can be accomplished by the provision of a battery module including a plurality of battery cells that are sequentially stacked, each of the battery cells including an electrode assembly including a plurality of electrode plates and a plurality of electrode tabs withdrawn from the plurality of electrode plates, a pouch configured to receive the electrode assembly, the pouch including an extension part, and an electrode lead connected to the plurality of electrode tabs, the electrode lead extending from the extension part so as to be withdrawn to an outside through a withdrawal port, wherein, in order to secure the distance between the extension part of the pouch of one battery cell of the plurality of battery cells and the electrode lead of an adjacent battery cell of the plurality of battery cells, the extension part is provided with a bent part that is bent at a predetermined angle relative to the direction in which the plurality of battery cells are stacked.

The extension part may be bent along a first direction, which is perpendicular to the direction in which the extension part extends, and may then be bent along a second direction, which is opposite the first direction, such that the electrode lead is directed to the withdrawal port.

Each of the battery cells may further include a cover member extending from the extension part, the cover member being disposed so as to wrap the electrode lead.

The extension part may be bent along a first direction, which is perpendicular to the direction in which the extension part extends, and then the cover member may be bent along a second direction, which is opposite the first direction, such that the electrode lead is directed to the withdrawal port.

The plurality of extension parts of the plurality of battery cells may be bent at a plurality of positions spaced apart from each other by a predetermined distance in the direction in which each of the extension parts extends.

The plurality of extension parts of the plurality of battery cells may be sequentially bent at a plurality of positions spaced apart from each other by a predetermined distance in the direction in which each of the extension parts extends in the order in which the plurality of battery cells are stacked.

On the assumption that two adjacent positions, among the plurality of positions, are a first position and a second position, the extension part of one of the plurality of battery cells may be bent at the first position along a first direction, which is perpendicular to the direction in which the extension part extends, and may then be bent between the first position and the second position along a second direction, which is opposite the first direction, such that the electrode lead is directed to the withdrawal port.

Each of the battery cells may further include a cover member extending from the extension part, the cover member being disposed so as to wrap the electrode lead, and on the assumption that two adjacent positions, among the plurality of positions, are a first position and a second position, the extension part of one of the plurality of battery cells may be bent at the first position along a first direction, which is perpendicular to the direction in which the extension part extends, and then the cover member may be bent between the first position and the second position along a second direction, which is opposite the first direction, such that the electrode lead is directed to the withdrawal port.

Each of the battery cells may further include a connection member, made of a material capable of being plastically deformed, disposed between a connection part of the electrode lead connected to the plurality of electrode tabs and the electrode assembly. The bent part of the extension part may be located between the connection part of the electrode lead and the electrode assembly.

The plurality of electrode tabs of the electrode assembly may be electrically connected to the electrode lead via the connection member.

Advantageous Effects

In a battery module according to an embodiment of the present invention, an extension part of a pouch of a battery cell is bent, whereby it is possible to prevent contact between a pouch and an electrode lead of a plurality of adjacent battery cells. Consequently, it is not necessary to attach an insulating tape to a part at which there is the concern that the pouch and the electrode lead may contact each other, and therefore it is possible to solve a problem that occurs due to the process of attaching the insulating tape. In addition, since it is possible to prevent contact between the pouch and the electrode lead of the plurality of adjacent battery cells, it is possible to prevent the corrosion of the pouch, the leakage of an electrolytic solution, etc., which may be caused due to contact between the pouch and the electrode lead.

DESCRIPTION OF DRAWINGS

FIG. 1 is a perspective view schematically showing a battery cell of a conventional battery module.

FIG. 2 is an exploded perspective view schematically showing the battery cell of the conventional battery module.

FIG. 3 is a side view schematically showing the state in which electrode leads contact extension parts of pouches in the state in which battery cells of the conventional battery module are stacked.

FIG. 4 is a side view schematically showing the state in which extension parts of pouches of battery cells of a battery module according to a first embodiment of the present invention are bent in the state in which the battery cells are stacked.

FIG. 5 is a sectional view schematically showing a battery cell of the battery module according to the first embodiment of the present invention.

FIG. 6 is a perspective view schematically showing a battery cell of a battery module according to a second embodiment of the present invention.

FIG. 7 is a side view schematically showing the state in which extension parts of pouches of battery cells of the battery module according to the second embodiment of the present invention and cover members are bent in the state in which the battery cells are stacked.

FIG. 8 is a sectional view schematically showing the battery cell of the battery module according to the second embodiment of the present invention.

FIG. 9 is a sectional view schematically showing a battery cell of a battery module according to a third embodiment of the present invention.

BEST MODE

Hereinafter, a battery module according to an embodiment of the present invention will be described with reference to the accompanying drawing.

As shown in FIGS. 4 and 5, a battery module according to a first embodiment of the present invention includes pouch-shaped battery cells 200. Each of the battery cells 200 may include an electrode assembly 210, electrode leads 220, and a pouch 230.

Hereinafter, for the convenience of description, the length direction of the battery cell 200 will be defined as an X-axis direction, the width direction of the battery cell 200 will be defined as a Y-axis direction, and the thickness direction of the battery cell 200 will be defined as a Z-axis direction.

The electrode assembly 210 may include a plurality of electrode plates and a plurality of separators interposed between the plurality of electrode plates. The plurality of electrode plates may include one or more positive electrode plates and one or more negative electrode plates. Each of the electrode plates of the electrode assembly 210 may be provided with an electrode tab 240. The electrode tab 240 may be configured so as to protrude outwards from a corresponding one of the electrode plates.

The end (the connection part) of each of the electrode leads 220 may be connected to the electrode assembly 210 via the electrode tabs 240, and the end of the electrode lead 220 that is opposite the connection part of the electrode lead, which is connected to the electrode assembly 210, may be exposed out of the pouch 230. The electrode leads 220 serve as electrode terminals of the battery module.

The pouch 230 has therein a reception space configured to receive the electrode assembly 210 and an electrolytic solution. The pouch 230 may include a first pouch member 231 and a second pouch member 232.

The first pouch member 231 and the second pouch member 232 may be coupled to each other in order to form the reception space. The edges of the first pouch member 231 and the second pouch member 232 may be sealed together by thermal bonding, etc., whereby the reception space may be hermetically sealed.

The pouch 230 has an extension part 235, which extends from the part of the pouch in which the reception space is formed, and the electrode leads 220 are withdrawn outwards from the extension part 235.

The plurality of battery cells 200 are stacked in the Z-axis direction, and each of the plurality of battery cells 200 is provided at one side thereof with withdrawal ports 290, through which the plurality of electrode leads 220 withdrawn from the battery cell 200 are withdrawn outwards.

In the battery module according to the first embodiment of the present invention, in order to prevent contact between the electrode leads 220 and the extension part 235 of the pouch 230 of a plurality of adjacent battery cells 200, among the plurality of battery cells 200, the extension part 235 of the pouch 230 may be bent at a predetermined angle relative to the direction in which the plurality of battery cells 200 are stacked (the Z-axis direction). Consequently, the extension part 235 may be provided with a bent part B.

Since the extension part 235 is bent at a predetermined angle relative to the direction in which the plurality of battery cells 200 are stacked (the Z-axis direction), it is possible to secure sufficient distance between the extension part 235 and the electrode leads 220 of a plurality of battery cells 200 that are disposed so as to be adjacent to each other, whereby it is possible to prevent contact between the extension part 235 and the electrode leads 220.

As shown in FIG. 4, the extension part 235 may be bent a plurality of times. That is, the extension part 235 may be provided with a plurality of bent parts B. In the case in which the extension part 235 is bent a plurality of times, the extension part 235 may be bent first in a first direction (a negative Z-axis direction), which is perpendicular to the direction in which the extension part 235 extends (the X-axis direction), and may then be bent in a second direction (a positive Z-axis direction), which is opposite the first direction, such that the electrode leads 220 withdrawn from the extension part 235 are directed to the withdrawal port 290.

As shown in FIG. 5, a pair of molds 281 and 282, each of which has a pressing surface having a shape corresponding to the shape of the extension part 235 that is bent, may press opposite sides of the extension part 235 in order to simultaneously form a plurality of bent parts B at the extension part 235.

At the bent parts B, the electrode leads 220 may be coupled to the extension part 235. For example, the electrode leads 220 may be inserted into the extension part 235. Each of the electrode leads 220 may be made of a metal, such as copper. After the extension part 235 and the electrode leads 220 are pressed by the molds 281 and 282, therefore, the electrode leads 220 may be plastically deformed, whereby the bent shapes of the extension part 235 and the electrode leads 220 may be maintained.

As shown in FIG. 4, in the state in which the plurality of battery cells 200 are stacked in the direction (the Z-axis direction) perpendicular to the direction in which each of the extension parts 235 extends (the X-axis direction), the plurality of extension parts 235 of the plurality of battery cells 200 may be bent at a plurality of positions C1, C2, and C3 spaced apart from each other by a predetermined distance in the direction in which each of the extension parts 235 extends (the X-axis direction). That is, the bent part B of each of the plurality of extension parts 235 may be located at a corresponding one of the plurality of positions C1, C2, and C3 spaced apart from each other by a predetermined distance in the direction in which each of the extension parts 235 extends (the X-axis direction).

At this time, at least some of the plurality of extension parts 235 may be bent at the plurality of positions C1, C2, and C3 in the same direction or in different directions.

Meanwhile, the plurality of extension parts 235 of the plurality of battery cells 200 may be sequentially bent in the order in which the plurality of battery cells 200 are stacked in the direction in which each of the extension parts 235 extends (the X-axis direction). That is, the bent part B of each of the plurality of extension parts 235 of the plurality of battery cells 200, which are sequentially stacked, may be sequentially located at the plurality of positions C1, C2, and C3, which are spaced apart from each other by a predetermined distance in the direction in which each of the extension parts 235 extends (the X-axis direction) and which are sequentially located.

In addition, on the assumption that the plurality of positions C1, C2, and C3, which are spaced apart from each other by a predetermined distance in the direction in which each of the extension parts 235 extends (the X-axis direction) and which are sequentially located, are a first position C1, a second position C2, and a third position C3, the extension part 235 of one of the plurality of battery cells 200 may be bent at the first position C1 in the first direction, and may then be bent between the first position C1 and the second position C2 in the second direction, which is opposite the first direction, such that the electrode leads 220 are directed to the withdrawal ports 290.

In the battery module according to the first embodiment of the present invention, as described above, the extension part 235 of the pouch 230 of each of the battery cells 200 is bent a plurality of times, whereby it is possible to prevent contact between the pouch 230 and the electrode leads 220 of a plurality of battery cells 200 that are adjacent to each other. Since it is not necessary to attach an insulating tape to a part at which there is the concern that the pouch 230 and the electrode leads 220 may contact each other, therefore, it is possible to solve a problem that occurs due to the process of attaching the insulating tape. In addition, since it is possible to prevent contact between the pouch 230 and the electrode leads 220 of a plurality of battery cells 200 that are adjacent to each other, it is possible to prevent the corrosion of the pouch, the leakage of the electrolytic solution, etc., which may be caused due to contact between the pouch 230 and the electrode leads 220.

Hereinafter, a battery module according to a second embodiment of the present invention will be described with reference to FIGS. 6 to 8.

As shown in FIGS. 6 to 8, the battery module according to the second embodiment of the present invention includes pouch-shaped battery cells 300. Each of the battery cells 300 may include an electrode assembly 310, electrode leads 320, a pouch 330, and a cover member 350 extending from the pouch 330 so as to cover a portion of each of the electrode leads 320.

The cover member 350 may be disposed so as to wrap the electrode leads 320 in order to protect the electrode leads 320. The cover member 350 may be made of a material that does not electrochemically react with adjacent electrode leads 320 or an adjacent extension part 335 even if the electrode leads 320 contact the adjacent electrode leads 320 or the adjacent extension part 335. For example, the cover member 350 may be made of an insulative material. For example, the cover member 350 may be configured in the form of a film.

As shown in FIGS. 6 and 7, each of the extension part 335 of the pouch 330 and the cover member 350 may be bent once. That is, the extension part 335 may be bent once. That is, the extension part 235 may be provided with a single bent part B1. In addition, the cover member 350 may be provided with a single bent part B2. In this case, the extension part 335 may be bent in the first direction (the negative Z-axis direction), which is perpendicular to the direction in which the extension part 335 extends (the X-axis direction), and then the cover member 350, which extends from the extension part 335, may be bent in the second direction (the positive Z-axis direction), which is opposite the first direction, such that the electrode leads 320 are directed to withdrawal ports 390. For example, in the case in which it is difficult to bend the extension part 335 a plurality of times, the cover member 350 may be bent in order to prevent the electrode leads 320 from coming into contact with an adjacent extension part 335.

As shown in FIG. 8, a pair of molds 381 and 382, each of which has a pressing surface having a shape corresponding to the shape of the extension part 335 and the cover member 350, which are bent, may press the extension part 335 and the cover member 350 in order to simultaneously form the bent parts B1 and B2 at the extension part 335 and the cover member 350, respectively.

At the bent parts B1 and B2, the electrode leads 320 may be coupled to the extension part 335 and to the cover member 350. For example, the electrode leads 320 may be inserted into the extension part 335 and the cover member 350. Each of the electrode leads 320 may be made of a metal, such as copper. After the extension part 335, the cover member 350, and the electrode leads 320 are pressed by the molds 381 and 382, therefore, the electrode leads 320 may be plastically deformed, whereby the bent shapes of the extension part 335, the cover member 350, and the electrode leads 320 may be maintained.

As shown in FIG. 7, in the state in which the plurality of battery cells 300 are stacked in the direction (the Z-axis direction) perpendicular to the direction in which each of the extension parts 335 extends (the X-axis direction), the plurality of extension parts 335 of the plurality of battery cells 300 may be bent at a plurality of positions C1, C2, and C3 spaced apart from each other by a predetermined distance in the direction in which each of the extension parts 335 extends (the X-axis direction). That is, the bent part B1 of each of the plurality of extension parts 335 may be located at a corresponding one of the plurality of positions C1, C2, and C3 spaced apart from each other by a predetermined distance in the direction in which each of the extension parts 335 extends (the X-axis direction).

At this time, at least some of the plurality of extension parts 335 may be bent at the plurality of positions C1, C2, and C3 in the same direction or in different directions.

Meanwhile, the plurality of extension parts 335 of the plurality of battery cells 300 may be sequentially bent in the order in which the plurality of battery cells 300 are stacked in the direction in which each of the extension parts 335 extends (the X-axis direction). That is, the bent parts B1 of the plurality of extension parts 335 of the plurality of battery cells 300, which are sequentially stacked, may be sequentially located at the plurality of positions C1, C2, and C3, which are spaced apart from each other by a predetermined distance in the direction in which each of the extension parts 335 extends (the X-axis direction) and which are sequentially located.

In addition, on the assumption that the plurality of positions C1, C2, and C3, which are spaced apart from each other by a predetermined distance in the direction in which each of the extension parts 335 extends (the X-axis direction) and which are sequentially located, are a first position C1, a second position C2, and a third position C3, the extension part 335 of one of the plurality of battery cells 300 may be bent at the first position C1 in the first direction, and then the cover member 350, which extends from the extension part 335, may be bent between the first position C1 and the second position C2 in the second direction, which is opposite the first direction, such that the electrode leads 320 are directed to the withdrawal ports 390.

In the battery module according to the second embodiment of the present invention, as described above, the extension part 335 of the pouch 330 and the cover member 350 of each of the battery cells 300 are bent, whereby it is possible to prevent contact between the pouch 330 and the electrode leads 320 of a plurality of battery cells 300 that are adjacent to each other. Since it is not necessary to attach an insulating tape to a part at which there is the concern that the pouch 330 and the electrode leads 320 may contact each other, therefore, it is possible to solve a problem that occurs due to the process of attaching the insulating tape. In addition, since it is possible to prevent contact between the pouch 330 and the electrode leads 320 of a plurality of battery cells 300 that are adjacent to each other, it is possible to prevent corrosion of the pouch, leakage of the electrolytic solution, etc., which may be caused due to contact between the pouch 330 and the electrode leads 320.

Hereinafter, a battery module according to a third embodiment of the present invention will be described with reference to FIG. 9.

As shown in FIG. 9, the battery module according to the third embodiment of the present invention includes pouch-shaped battery cells 400. Each of the battery cells 400 may include an electrode assembly 410, electrode leads 420, a pouch 430, and a connection member 460 disposed in an extension part 435 of the pouch 430, the connection member 460 being configured to be plastically deformed.

Each of the electrode leads 420 may not extend throughout the extension part 435 but may be connected or coupled only to a portion of the end of the extension part 435. In this case, bent parts B may be located between the electrode assembly 410 and a connection part provided at the end of each of the electrode leads 420. That is, the electrode leads 420 may not be disposed, but the connection member 460 may be disposed, in the extension part 435, at which the bent parts B are located.

Although not shown, electrode tabs 440 withdrawn from the electrode assembly 410 may extend through the extension part 435 and may then be connected to the connection part provided at the end of each of the electrode leads 420. The bent parts B of the extension part 435 may be located between the connection part of each of the electrode leads 420 and the electrode assembly 410. In this case, the connection member 460 may serve to maintain the shape of the extension part 435 without electrical connection with the electrode tabs 440 and/or the electrode leads 420. At this time, the connection member 460 may be made of a non-conductor.

In another example, as shown in FIG. 9, the connection member 460 may be made of a conductor, and the electrode tabs 440 withdrawn from the electrode assembly 410 may be electrically connected to the connection part of each of the electrode leads 420 via the connection member 460. Consequently, the bent parts B of the extension part 435 may be located between the connection part of each of the electrode leads 420 and the electrode assembly 410. The bent parts B of the extension part 435 may be located at the part at which the connection member 460 is disposed.

As shown in FIG. 9, a pair of molds 481 and 482, each of which has a pressing surface having a shape corresponding to the shape of the extension part 435 that is bent, may press the extension part 435 in order to simultaneously form a plurality of bent parts B at the extension part 435.

The connection member 460, which is made of a material capable of being plastically deformed, is disposed at the bent parts B. After the extension part 435 and the connection member 460 are pressed by the molds 481 and 482, therefore, the connection member 460 may be plastically deformed, whereby the bent shapes of the extension part 235 and the connection member 460 may be maintained.

In the battery module according to the third embodiment of the present invention, as described above, the connection member 460, which is made of a material capable of being plastically deformed, is provided in the extension part 435 of the pouch 430. Even in the case in which the extension part 435 or each of the electrode leads 420 is made of a material that cannot be plastically deformed, therefore, the bent shape of the extension part 435 may be maintained. For example, even in the case in which each of the electrode leads 420 is made of a flexible conductor, the bent shape of the extension part 435 may be maintained by the connection member 460.

The construction having the connection member 460 described above may be applied to the second embodiment of the present invention. According to this construction, the bent shapes of the extension part 335 and the cover member 350 may be maintained by a connection member that is capable of being plastically deformed, rather than the electrode leads 320.

Although the preferred embodiments of the present invention have been described by way of illustration, the scope of the present invention is not limited to the specific embodiments described herein, and the present invention can be appropriately modified within the category described in the claims.

The invention claimed is:

1. A battery module comprising a plurality of battery cells that are vertically stacked, each of the battery cells including:
    an electrode assembly including a plurality of electrode plates and a plurality of electrode tabs withdrawn from the plurality of electrode plates;
    a pouch configured to receive the electrode assembly, the pouch including an extension part; and
    an electrode lead connected to the plurality of electrode tabs, the electrode lead extending from the extension part so as to be withdrawn to an outside through a withdrawal port,
    wherein the extension part of the pouch is provided with a bent part that is bent away from the pouch at a predetermined angle relative to a direction in which the plurality of battery cells are stacked vertically to provide a distance between the extension part of the pouch of one battery cell of the plurality of battery cells and the electrode lead of an adjacent battery cell of the plurality of battery cells, the extension part being spaced apart from a surface of the pouch, and
    wherein the plurality of extension parts of the plurality of battery cells are bent at a plurality of positions spaced apart from each other by a predetermined distance in a direction in which each of the extension parts extends.

2. The battery module according to claim 1, wherein the extension part is bent along a first direction, which is perpendicular to a direction in which the extension part extends, and is then bent along a second direction, which is opposite the first direction, such that the electrode lead is directed to the withdrawal port.

3. The battery module according to claim 1, wherein each of the battery cells further comprises a cover member extending from the extension part, the cover member being disposed so as to wrap the electrode lead.

4. The battery module according to claim 3, wherein the extension part is bent along a first direction, which is perpendicular to a direction in which the extension part extends, and then the cover member is bent along a second direction, which is opposite the first direction, such that the electrode lead is directed to the withdrawal port.

5. The battery module according to claim 1, wherein the plurality of extension parts of the plurality of battery cells are sequentially bent at the plurality of positions spaced apart from each other by the predetermined distance in the direction in which each of the extension parts extends in an order in which the plurality of battery cells are stacked.

6. The battery module according to claim 1, wherein two adjacent positions among the plurality of position are a first position and a second position, the extension part of one of the plurality of battery cells is bent at the first position along a first direction, which is perpendicular to a direction in which the extension part extends, and is then bent between the first position and the second position along a second direction, which is opposite the first direction, such that the electrode lead is directed to the withdrawal port.

7. The battery module according to claim 1, wherein
each of the battery cells further comprises a cover member extending from the extension part, the cover member being disposed so as to wrap the electrode lead, and
two adjacent positions among the plurality of positions are a first position and a second position, the extension part of one of the plurality of battery cells is bent at the first position along a first direction, which is perpendicular to a direction in which the extension part extends, and then the cover member is bent between the first position and the second position along a second direction, which is opposite the first direction, such that the electrode lead is directed to the withdrawal port.

8. The battery module according to claim 1, wherein
each of the battery cells further comprises a connection member, made of a material capable of being plastically deformed, disposed between a connection part of the electrode lead connected to the plurality of electrode tabs and the electrode assembly, and
the bent part of the extension part is located between the connection part of the electrode lead and the electrode assembly.

9. The battery module according to claim 8, wherein the plurality of electrode tabs of the electrode assembly are electrically connected to the electrode lead via the connection member.

* * * * *